United States Patent [19]

Wyatt

[11] 4,240,772
[45] Dec. 23, 1980

[54] APPARATUS AND METHOD FOR CONVEYING GRAIN

[76] Inventor: John E. Wyatt, P.O. Box 37, Afton, Iowa 50830

[21] Appl. No.: 851,363

[22] Filed: Nov. 14, 1977

[51] Int. Cl.³ .......................... B65G 65/00; B65G 1/00
[52] U.S. Cl. .................................... 414/299; 414/272; 198/362
[58] Field of Search .............. 214/17 C, 17 D, 16 R; 222/167–168, 218, 330; 198/372, 362; 193/23; 414/288, 293, 298, 299, 300–303, 317, 272

[56] References Cited

U.S. PATENT DOCUMENTS

| | | | |
|---|---|---|---|
| 1,222,219 | 4/1917 | LaFont | 198/362 |
| 2,565,663 | 8/1951 | Osterbur et al. | 414/293 |
| 3,103,276 | 9/1963 | Schmitzer | 198/362 |
| 3,365,083 | 1/1968 | Baumann et al. | 414/267 |
| 3,838,781 | 10/1974 | Dietz | 414/293 |
| 4,033,467 | 7/1977 | Bewley et al. | 414/293 |

FOREIGN PATENT DOCUMENTS

| | | | |
|---|---|---|---|
| 1108436 | 1/1956 | France | 414/293 |
| 1216337 | 11/1959 | France | 414/293 |

Primary Examiner—Stephen G. Kunin
Assistant Examiner—R. B. Johnson
Attorney, Agent, or Firm—Zarley, McKee, Thomte, Voorhees & Sease

[57] ABSTRACT

Grain to be conveyed is supplied to an elongated chamber having a ram movable longitudinally through the chamber. A discharge opening at the end of the chamber communicates with a grain delivery tube which extends into a grain storage bin. As the ram is moved through the chamber, grain is forced outwardly through the discharge opening, through the grain delivery tube and into the bin. A discharge end portion of the tube within the bin is provided with vertically spaced openings for discharging grain at a vertical position close to the level of grain within the bin. Radially and downwardly directed spouts over the vertically spaced openings prevent the backflow of grain through the delivery tube.

3 Claims, 5 Drawing Figures

U.S. Patent     Dec. 23, 1980     4,240,772
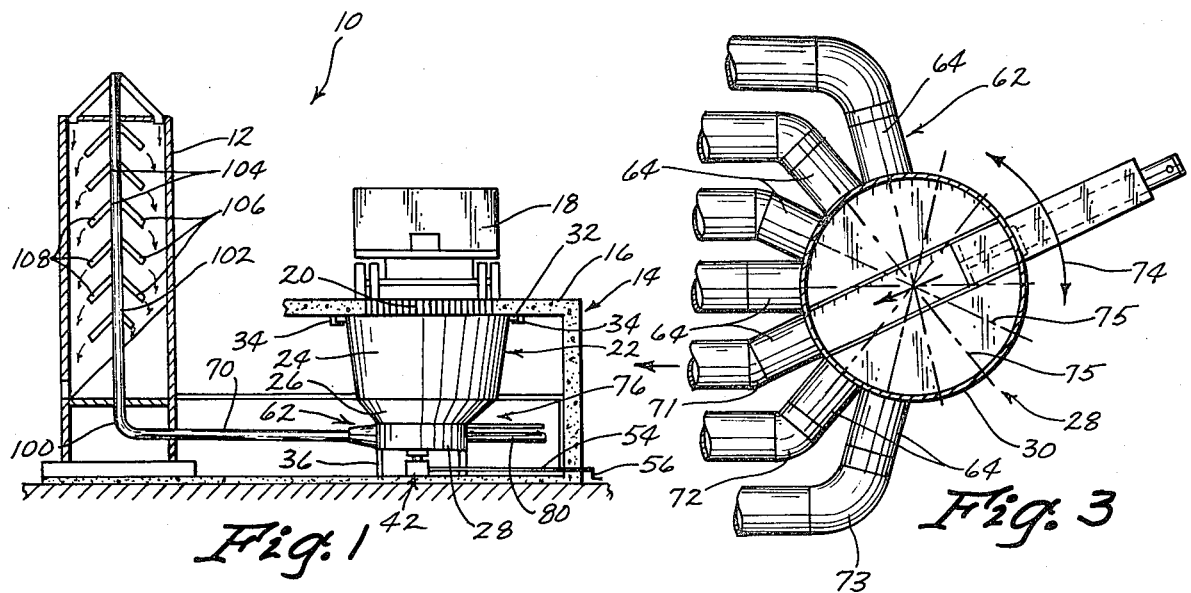
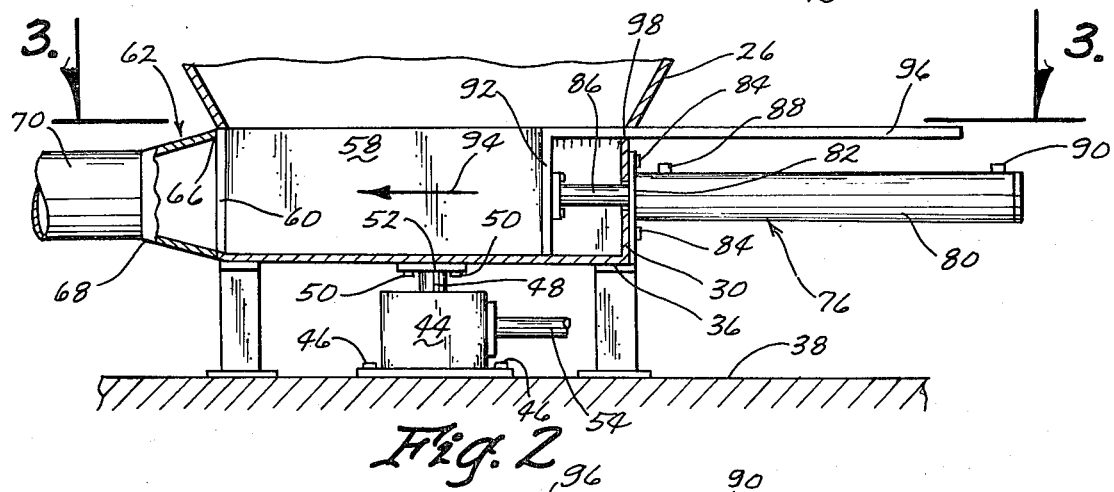
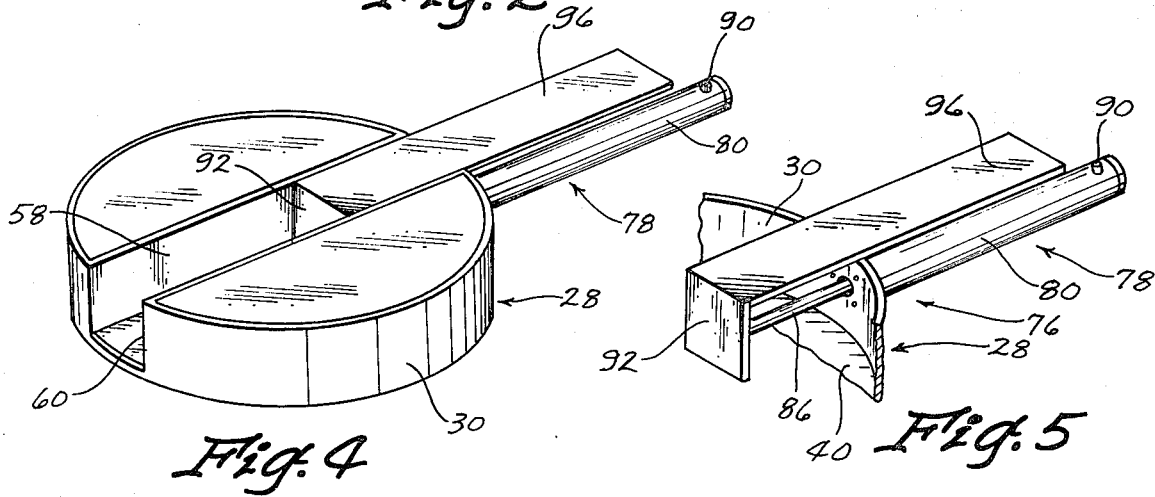

APPARATUS AND METHOD FOR CONVEYING GRAIN

BACKGROUND OF THE INVENTION

This invention relates to an apparatus and method for moving grain and more particularly to an apparatus and method for conveying grain into and through an elongated delivery tube for discharge into a grain storage bin.

It has long been a practice to store grain in upright bins and, accordingly, various means have been employed for conveying grain into the bins. In one method, grain is supplied to a feeder hopper at one end of an enclosed auger which rotated to convey grain through the enclosure. Such systems are limited by the expense of the auger sections and also by the breakage between the auger and its enclosure. Another way of conveying grain through a delivery tube is by forced air. In these systems, grain is blown through delivery tubes and into the storage bins. The turbulent air, however, stirs up substantial quantities of grain dust which results in a health hazard for the grain handlers and more than an insubstantial loss of grain material.

In both systems, the common practice is to discharge grain from the delivery tube at the top of the bin, thereby allowing the grain to fall to the level of grain within the bin. The impact of the falling grain results in further breakage and additional grain dust.

These common problems in the handling of grain are resolved by the apparatus and method of the present invention.

SUMMARY OF THE INVENTION

In the apparatus and method of the present invention, grain is supplied to an elongated chamber having a discharge opening at one end and a ram movable longitudinally through the chamber for pushing the grain in the chamber outwardly through the discharge opening. The grain discharged from the chamber is conveyed through a delivery tube which enters at the base of the grain storage bin and extends upwardly therethrough. Since the delivery tubes are simply hollow lengths of uniform tubing, the tubing sections are lighter and less expensive than auger sections as well as being free of the type of grain breakage associated with auger conveyors.

Vertically spaced openings are provided in the upright portion of the grain delivery tube within the storage bin. Thus, grain is discharged from the tube through those openings situated just above the level of grain in the bin. With the point of discharge closely adjacent the level of grain in the bin, the breakage and dust associated with grain falling great distances within the bin is substantially eliminated.

The elongated chamber is formed within an annular housing which is rotatably mounted about its central axis. A stationary distributor assembly includes a plurality of circumferentially spaced and radially directed discharge tubes to which a number of grain delivery tubes are coupled for conveying grain to separate bins associated with the respective delivery tubes. Thus the delivery of grain to one bin can be cut off and delivery to another bin immediately initiated by simply rotating the annular housing to align the chamber with that discharge tube associated with the delivery tube for the other bin.

Therefore, an object of the present invention is an improved apparatus and method for conveying grain.

Another object of the invention is a grain delivery system wherein grain supplied to an elongated chamber is moved into and through a delivery tube by a ram movable longitudinally through the chamber.

A further object of the invention is a grain discharge tube extended upwardly through a grain storage bin and having vertically spaced discharge openings therealong.

A related object of the invention is the provision of such a discharge tube with means for preventing the backflow of grain from the bin into the tube.

Another object of the invention is a supply chamber movably mounted for alignment with a number of grain delivery tubes.

A more specific object of the invention is the provision of a distributor assembly having a plurality of circumferentially spaced and radially directed discharge tubes adapted to receive grain from a rotatable supply chamber which may be angularly directed to a selected one of the discharge tubes.

BRIEF DESCRIPTION OF THE DRAWINGS

FIG. 1 is a diagrammatic side elevational view, partly in section, of the system for conveying grain according to the present invention;

FIG. 2 is an enlarged sectional view showing the rotatable supply chamber and ram movable therethrough;

FIG. 3 is a sectional view, taken along line 3—3 of FIG. 2, showing the rotatable chamber housing and distributor assembly;

FIG. 4 is a detail perspective view of the annular chamber housing and ram assembly; and FIG. 5 is a detail perspective view of the ram and chamber cover assembly.

DESCRIPTION OF THE PREFERRED EMBODIMENT

The grain conveying apparatus of the present invention, indicated generally at 10 in FIG. 1, is shown in assembly relation with a grain storage bin 12 and a receiving pit structure 14. The pit structure includes an elevated platform 16 onto which a grain hauling truck 18 may be driven for dumping the grain from the truck through a large grate 20 situated above the receiving hopper 22 of the present invention.

The receiving hopper 22 is a large funnel shaped member including a steep upper conical wall 24 which merges at its lower end with a more inclined lower conical wall 26. The bottom of the hopper 2 is open for the free flow of grain therethrough.

An annular housing 28 is secured onto the bottom of the hopper 22 such as by a generally continuous weld along the juncture of the housing side wall 30 and lower wall 26 of the hopper. The hopper and housing assembly is supported for rotation in unison about its vertical central axis. For this purpose, a radially outwardly directed flange 32 at the top of the upper wall 24 is rotatably carried within an annular L-section guideway 34 secured to the underside of the platform 16. Further support for the hopper and housing assembly is provided by an upright annular track 36 supported on the ground 38 and slideably engageable with the outer periphery of the housing base wall 40. The contact surfaces between the track 36 and housing 28 may be coated with a suitable lubricant for reducing friction or a roller bearing means may be interposed between the track and housing to further facilitate rotation and provide support for the housing.

Rotation of the hopper 22 and the housing 28 assembly is accomplished by means of a bearing and gear mechanism 42, shown in FIGS. 1 and 2. The mechanism includes a bearing and gear housing 44 secured to the ground by bolts 46. A vertical shaft 48 extends upwardly from the gear housing 44 for attachment to the base wall 40 of annular housing 28 by bolts 50 and flange 52. The vertical shaft 48 is rotated by a crank shaft 54 extended horizontally through the side wall of the gear housing 44, through an opening in the annular track 36 and further outwardly through the structure 14, as shown in FIG. 1. A crank handle 56 is secured onto the crank shaft 54 for rotating the hopper and housing assembly for a purpose described below.

Annular housing 28 is shown in FIG. 4 as a generally closed disc-shaped member except for an open topped channel or chamber 58 extended diametrically across the housing. Accordingly, grain falls freely by the action of gravity from the hopper 22 into the open topped chamber 58 to fill it. One end of the chamber 58 has a discharge opening 60 through which grain in the chamber is moved for delivery to the storage bin 12.

Referring to FIGS. 2 and 3, it is seen that the annular housing 28 is surrounded by a stationary distributor assembly 62 including a plurality of circumferentially arranged and radially directed tube adapter sections 64. The sections 64 may be arranged in contact with one another and welded or otherwise secured together to form a unitary distributor assembly 62. Each tube adapter section 64 is of a shape to conform to the discharge opening 60 at its inner end 66 and suitably shaped at its outer end 68 for coupling to an elongated grain delivery tube 70 through which grain is moved from the chamber 58 to the storage bin 12. Any suitable coupling between the grain delivery tubes 70 and adapter sections 64 may be used including the elbow couplings 71, 72 and 73 shown in FIG. 3 for directing the grain delivery tubes at appropriate angles from the annular housing 28.

Referring to FIG. 3, it is seen that the annular housing 28 is rotatable as indicated by arrow 74 through an angle of almost 180° for alignment of the chamber 58 with any selected one of the adapter sections 64, as indicated by the dotted diametrical lines 75.

Movement of the grain from the elongated chamber 58 into one of the adapter sections 64 and through the associated delivery tubes 70 is accomplished by a ram, indicated generally at 76, which is movable longitudinally through the chamber 58 for pushing the grain outwardly through the discharge opening 60. Ram 76 includes an extensible and retractable hydraulic cylinder unit 78 the cylinder portion 80 of which is secured at one end to the housing side wall 30 by an appropriate mounting flange 82 and bolts 84. The hydraulic cylinder unit 78 is positioned so that the cylinder portion 80 extends radially from the housing in alignment with the horizontal center line of the chamber 58. Accordingly the piston rod 86 is movable longitudinally through the chamber 58 in response to extension and retraction of the hydraulic cylinder unit 78. Hydraulic lines 88 and 90 connect opposite ends of the cylinder portion 80 with a suitable source of hydraulic fluid pressure (not shown).

Secured to the inner end of the piston rod 86 is an upright push plate 90 of a shape and size corresponding to the internal cross section of the chamber 58. Thus, upon extension of the hydraulic cylinder unit 78, all of the grain in the chamber 58 in front of push plate 92 is moved in the direction of arrow 94 in FIG. 2 outwardly through the discharge opening 60 and into the grain delivery tube 70.

With reference to FIG. 2, it can be seen that if grain were allowed to fall into the chamber 58 behind the push plate 92, retraction of the hydraulic cylinder unit 78 would be prevented. Accordingly, a chamber cover plate 96 is secured to the top of the push plate 92 and extended rearwardly therefrom to cover the chamber 58 behind the push plate 92. Cover plate 96 is movable with the push plate and is slideable through the housing side wall 30 in a slot 98 provided therefor.

Each grain delivery tube 70 extends generally horizontally away from the annular housing 28 and into the base of an associated grain storage bin 12 as shown in FIG. 1. A bend in the tube at 100 directs a discharge end portion 102 upwardly through the bin along the central axis thereof. The discharge tube portion 102 extends upwardly to the top of the bin so that grain moved through the end portion 102 can fill the bin 12.

The discharge tube portion 102 is provided with many vertically and circumferentially spaced openings along substantially the entire length of the tube within the bin 12. Accordingly, grain moved upwardly through the tube portion 102 is discharged through those openings 104 which are situated just above the level of grain in the bin 12. The result is that all of the grain discharged from the tube falls a very short distance regardless of the level of grain within the bin 12.

To prevent the backflow of grain from the bin into the openings 104 as the level of grain rises above them, spouts 106 are connected to the tube portion 102 in communication with the openings 104. The spouts 106 extend downwardly and radially outwardly from the openings 104 so as to position the outlet end 108 of the spout at a lower vertical position than the associated opening 104. Since grain does not flow uphill, backflow through the openings 104 is prevented. The spouts 106 may be of tubular construction as shown or simply open bottom channel members.

In operation, a loaded grain delivery truck 18 is driven onto the platform 16 of the receiving pit structure 14 whereupon the grain in the truck is dumped through the grate 20 and into the receiving hopper 22. An operator need only select the storage bin 12 which is to be filled and rotate the crank handle 56 (FIG. 1) to align the chamber 58 with the appropriate distributor section 64 for delivery of grain through the delivery tube 70 associated with that bin. Upon actuation of the hydraulic cylinder unit 78 to move the push plate 92 longitudinally through the chamber 58, the grain within the chamber is pushed outwardly through the discharge opening 60. Upon retraction and subsequent extension of the ram 76, additional grain from the hopper 22 falls into the chamber 58 and is moved outwardly through the discharge opening 60 to push the grain ahead of it through the delivery tube 70 for discharge into the bin 12 through the vertically spaced openings 104.

In other embodiments, a pair of chambers may be provided with two rams actuatable in a way so that when one ram is pushing grain outwardly from its associated chamber the other ram is retracting and thus loading grain into its chamber. The result is a constant flow of material from the ram housing. In addition, the distributor may be constructed for directing material simultaneously to two or more bins.

It is apparent that the present invention affords a novel method for moving grain into a bin including the steps of providing a chamber and ram assembly, supplying grain to the chamber, moving the ram through the chamber to force grain outwardly through the discharge opening, directing the discharged grain through a delivery tube to a storage bin and discharging the grain from the tube at vertically spaced positions within the bin. The method further includes the steps of preventing the entrance of grain into the chamber behind the ram and orienting the chamber assembly for the discharge of grain into a selected one of several grain delivery tubes.

I claim:

1. An apparatus for conveying grain comprising, a housing including a bottom wall and an upright generally cylindrical side wall, said housing having an open topped chamber extended generally diametrically thereacross, said side will including a discharge opening in communication with one end of said chamber, a plurality of grain delivery tubes with one end portion thereof arranged in a horizontal disposition and in communication with said side wall, said end portion being generally radially directed and circumferentially spaced apart relative to said side wall, means for supporting said housing for rotation about the upright central axis thereof whereby said chamber is rotatable to selected angular positions for registration of said discharge opening with respective ones of said tube end portions, means for supplying grain to said chamber, a ram movable longitudinally through said chamber for moving grain in the chamber outwardly through said discharge opening and into the end portion of a grain delivery tube registered therewith, means for preventing the entrance of grain into the chamber behind the ram as the ram moves through the chamber, a grain bin, at least one of said delivery tubes including a grain discharge portion extended upwardly within said bin, said discharge portion having a plurality of vertically spaced openings therealong such that grain moved upwardly through said discharge portion by said ram is discharged into the bin through said vertically spaced openings, and a plurality of spouts connected to said grain discharge portion in communication with respective vertically spaced openings and extended downwardly and radially outwardly therefrom, thereby to prevent backflow of grain from said bin into said grain discharge portion.

2. The apparatus of claim 1 wherein the means for preventing the entrance of grain into the chamber includes a chamber cover connected to the ram and extended longitudinally rearwardly therefrom, said cover movable with the ram to cover the chamber rearwardly of the ram.

3. The apparatus of claim 1 wherein the means for supplying grain to said chamber includes a hopper open at the top for receiving grain and having an opening at the bottom through which grain is discharged into the chamber.

* * * * *